Patented Sept. 26, 1933

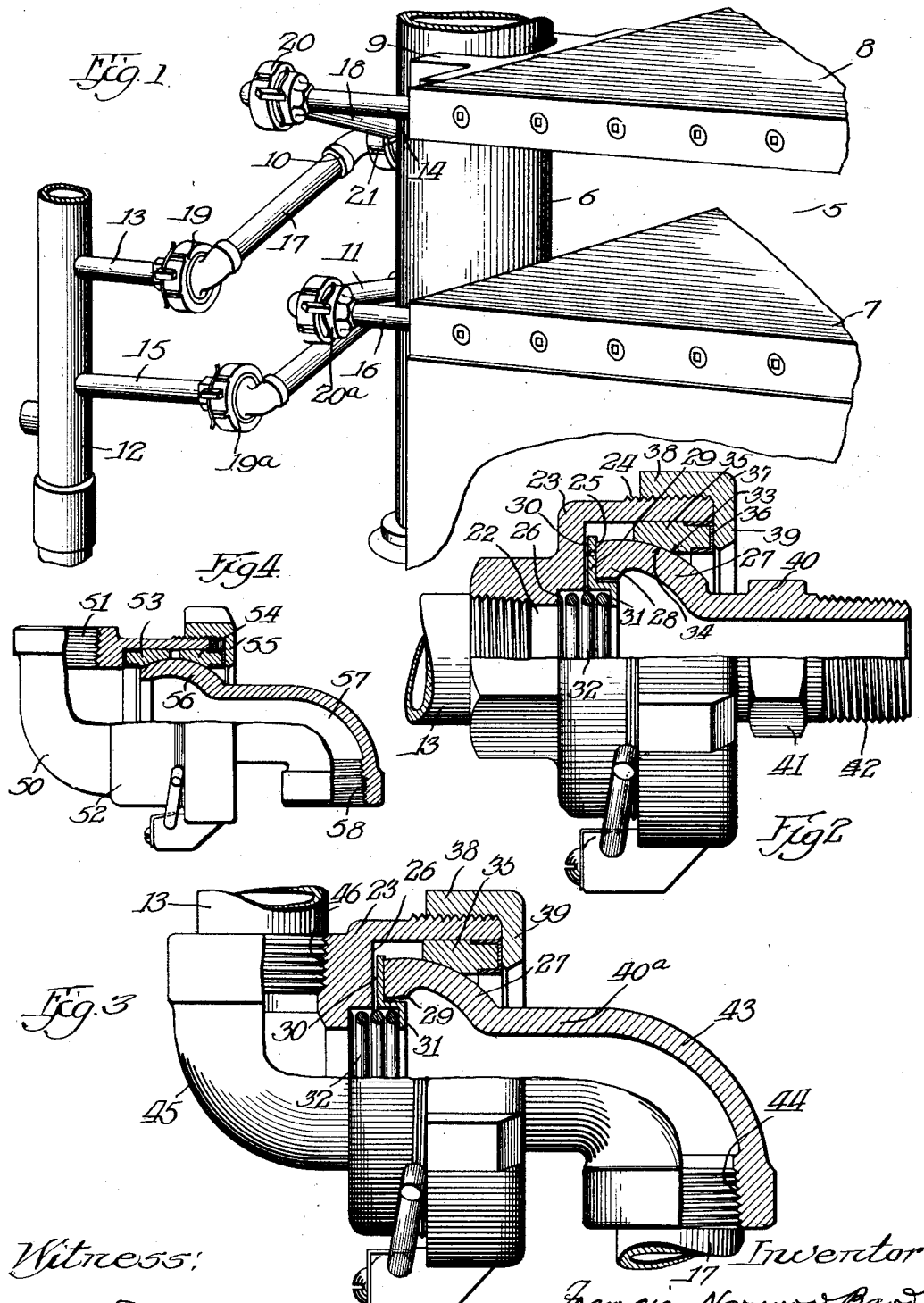

1,928,279

UNITED STATES PATENT OFFICE 1,928,279

PIPE JOINT

Francis Norwood Bard, Highland Park, Ill.

Application April 14, 1930. Serial No. 443,935

3 Claims. (Cl. 285—91)

This invention relates broadly to flexible conduits and more particularly to improvements in flexible conduits having rigid pipe sections.

While this invention is illustrated and described as applied to the relatively movable parts of a platen press, it will be understood that the invention may be employed for other analogous purposes and, therefore, finds a wide field of utility. In connecting the heated platens of a press of the type referred to herein, it is desired to convey steam from a header to the individual platens of the press and, while ordinary swivel joints have been employed by me, I have found that the joint of the present invention affords a more durable, convenient and safe manner of conducting steam or other heating fluid to the platens of the press. With ordinary swivel joints the alignment of the platens is not always entirely accurate and a swivel joint will not compensate for such inaccuracy and often will become leaky or blow out its packings in service unless that some means such as the present invention is provided for compensating for this inequality of arrangement of the parts of the press.

The principal objects and advantages of this invention are to provide an improved fluid connection generally between relatively movable members including rigid pipe sections wherein a combination of swivel and ball joints is employed; the provision of an improved fluid connection between relatively movable members of a platen press or the like or between any two relatively movable conduits in which two or more joints may be provided, one or more of which joints may be a ball joint while the other joints may be ordinary swivel joints; the provision of an improved swivel pipe joint; the provision of an improved swivel pipe joint having an improved packing therefor and an improved spring arrangement which maintains the head of one of the parts of the joint in engagement with the packing; and the provision of an improved pipe joint having means for taking up the wear in the packing and for locking a retaining means for the packing in position.

The foregoing and such other objects and advantages as may appear or be pointed out as this description proceeds are attained in the structural embodiments of the invention illustrated in the drawing in which:

Figure 1 is a fragmentary perspective view of an installation including the improvements of this invention;

Figure 2 is an enlarged elevational view partly in section of the improved joint of this invention;

Figure 3 is a view similar to Figure 2 of an alternative form of the invention; and Figure 4 is a view similar to Figures 3 and 4 of a ball joint.

Referring now more particularly to the drawing and first to Figure 1, in which is shown a platen press, generally designated 5, having a plurality of pillars only one of which, indicated at 6, is shown, a base or stationary platen 7 being mounted adjacent to the pillar 6 and a movable platen 8 being arranged to remove toward and away from the platen 7. The platen 8 is provided with a plurality of yokes for engaging the pillars, one of which is shown at 9.

The platens 7 and 8 are hollow and are adapted to receive steam or other heated fluid, or, if desired, a cold fluid depending on the use of the press through the medium of the flexible fluid connections indicated at 10 and 11, which form a connection between the header 12 and the two or more platens.

In the case of the fluid connection 10, a conduit section 13 extends from the header 12 and is placed in communication with the platen 8 by the provision of the connection 10 and a complemental conduit section 14 carried by the platen. Similar conduit sections 15 and 16 serve to provide a connection between the header 12 and the platen 7.

In view of the fact that the fluid connection members 10 and 11 are identical in construction, but one of the same will be described and, with reference to the connection 10, I provide a pair of pipe sections 17 and 18, the pipe section 17 having its outer end connected to the conduit 13 by a joint 19, is a joint similar to that shown in either Figures 2 or 3. Similarly, the pipe section 18 has its outer end connected by a swivel joint 20 to the conduit section 14. The intermediate joint 21, that is the joint which connects the adjacent ends of the pipes 17 and 18 is preferably a ball joint.

For the purpose of this description, applicant points out that the pipe joints of Figures 2 and 3 may be substantially identical with reference to their internal structure, but that the external arrangement of the threaded extensions may be varied to suit the particular installation in which the joint is to be employed. The joint 21 is a ball joint and may be of any approved durable construction.

Referring now more particularly to the swivel pipe joint per se, reference may be had first to Figure 2. Here the conduit section 13 is shown threaded into an opening 22 formed in the casing or socket member 23, which latter has an enlarged portion forming this socket. The enlarged portion of the casing 23 is externally threaded as at 24 and is internally annularly shouldered as at 25 and 26. The ball or head 27 of the joint lies within the casing and is provided with an internal enlarged annular portion 28 against which engages a stepped washer 29, having the portions 30 and 31, a helical expansion spring 32 being interposed between the portion or flange 31 of the washer 29 and the shoulder and tending to force the head away from the shoulder 25. The head 27 is provided with a substantially hemispherical outer surface 33, which engages a complemental surface 34 on a packing 35 of any suitable material, said packing being in the form of a ring lying against the internal annular surface of the casing 23 and provided with a metallic outer protective sheathing 36. A gland member 37, including an internally threaded flange 38, engages the thread 24 and is provided with an annular flange 39 which abuts the sheathing of the packing.

It will be observed that the swivel joint shown in Figure 3 is constructed internally substantially identically with the swivel joint in Figure 2, but the external construction is varied and therefore the same reference characters have been applied to the internal structure as in Figure 2.

In Figure 3, the head is provided with a neck portion 40, which extends through the open end of the casing 23 and is provided with a polygonal portion 41 whereby it may be rotated with a wrench and is externally threaded as at 42 to provide a joint with a pipe section, such as the pipe sections 17 or 18, as the case may be. In this instance, the neck 40a is provided with a curved portion 43 internally threaded as at 44 for connection to one or the other of the pipe sections 13 or 17, the pipe section 13 being shown. Further modification of the joint shown in Figure 2 is incorporated in Figure 3 wherein the casing, instead of projecting straight, as shown in Figure 2, is provided with a curved extension 45 having an internal threaded portion 46 for connection to say the pipe section 17.

Any other modification of the extending and connecting portions of the casing and neck may be made as desired. It will be observed that the joints 19 and 20 are of the same type of joint as that shown in Figures 2 and 3 and in Figure 1, although a ball joint is employed at 21.

The ball joint is best shown in Figure 4, and comprises a casing 50 having a threaded portion 51 for connection to one of the pipe sections 17 or 18 as the case may be. This casing 51 is provided with a cylindrical portion 52 in which suitable packing elements or wearing members 53 and 54 are retained by a gland member 55. A ball 56 rides in said packing members and is provided with a curved neck 57, threaded at 58 for connection to one of said pipe members. It will be understood that the construction of the ball joint may be modified to any approved form, though the form shown in Figure 4 is to be preferred, owing to its simplicity of construction and in view of the fact that the packing members may be readily removed for renewal as desired.

The advantages of this construction and combination of joints will be obvious in that any inaccuracy in the setting up of the pipe sections or in the movement of the platen in operation will be compensated for by the intermediate ball joint without undue strain on the swivel joints.

The coil spring in each swivel joint will tend to maintain the pipe sections in the positions generally shown in Figure 1, though a clearance is afforded permitting angular displacement and slight relative rotation of the pipe sections to facilitate movement of the platens and at the same time to form a fluid tight passageway from the header 12 to the platens. It will further be noted that a relatively large area of contact is afforded by the flattened annular portion of the ball member with the washer thus preventing relative canting of the washer and ball, yet sufficient clearance at 26 being provided to allow of a slight angular as well as rotative relative movement of the ball member in its socket. However, too great an angular displacement is prevented by the washer abutting the shoulder adjacent thereto. In the event of a tendency of the swivel joints to bind due to irregularities in the movement of the parts, the ball joint 21 will allow the pipe sections 17 and 18 to remain in a normal position within reasonable limits so that their portions 27 in the swivel joints will not twist, which would tend to bind the swivel joints or at least increase wear on the packing elements 35.

Having thus described my invention and illustrated its use, what I claim as new and desire to secure by Letters Patent is:

1. A swivel pipe joint comprising two tubular members one having a socket and the other having a substantially hemispherical ball head entering such socket, a gasket retained in said socket providing a seat for said ball head, a washer of stepped cross section directly engaging the inner end of said hemispherical ball head, said washer having an intermediate tubular part interfitted with the ball head and flange parts one of which overlies the end face of said head and the other of which is offset in a direction toward said gasket, and a helical spring seated in the socket member and acting against said offset flange of the washer, thereby yieldingly holding the ball head seated and in axial alinement with the socket, the clearance between the inner end of the ball head and the confronting wall of the socket member being only slightly greater than the thickness of the washer, thereby restricting relative angular displacement of said members.

2. A swivel pipe joint comprising two tubular members one having a ball head and the other having a socket receiving such head, a gasket retained in said socket and providing a ball seat engaged by said head, said head having a squared inner end providing a flat face and said socket member having a confronting flat face and recessed to provide a shoulder, a washer of stepped cross section centered in said head and arranged with the outer part of the washer lying against said flat end face of the head and the inner offset part of the washer within the head, and a helical spring centered in the socket member and washer and reacting between said shoulder and inner part of the washer, whereby the ball head is held seated in said gasket and the spring yieldingly maintains the two members in alinement, the clearance between the aforesaid flat faces being only slightly greater than the thickness of the washer, thereby restricting relative angular displacement of said members.

3. A swivel pipe joint comprising two tubular members one having a socket and the other having a substantially hemispherical ball head entering such socket, a gasket retained in said socket providing a seat for said ball head, the inner end of said ball head providing a flat annular face, a washer of stepped cross section directly engaging the inner end of said head, said washer having an intermediate tubular part and flange parts one of which overlies said flat face and the other of which is offset toward said gasket, and a helical spring centered in the socket member and reacting between it and said offset flange part of the washer to yieldingly hold the ball head seated and in axial alinement with the socket member.

FRANCIS NORWOOD BARD.